United States Patent
Hinderling et al.

(10) Patent No.: US 11,022,680 B2
(45) Date of Patent: Jun. 1, 2021

(54) DISTANCE MEASURING DEVICE WITH SPAD ARRAY AND RANGE WALK COMPENSENATION

(71) Applicant: HEXAGON TECHNOLOGY CENTER GMBH, Heerbrugg (CH)

(72) Inventors: Jürg Hinderling, Marbach (CH); Simon Bestler, Langenargen (DE); Thomas Piok, Koblach (AT); Andreas Walser, St. Gallen (CH); Rainer Wohlgenannt, Klaus (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 413 days.

(21) Appl. No.: 16/006,653

(22) Filed: Jun. 12, 2018

(65) Prior Publication Data

US 2018/0356502 A1 Dec. 13, 2018

(30) Foreign Application Priority Data

Jun. 13, 2017 (EP) .................................... 17175868

(51) Int. Cl.
| | | |
|---|---|---|
| *G01S 7/481* | (2006.01) | |
| *G01S 7/486* | (2020.01) | |
| *G01S 17/10* | (2020.01) | |
| *G01S 17/46* | (2006.01) | |
| *G01S 7/4863* | (2020.01) | |
| *G01S 7/4865* | (2020.01) | |

(52) U.S. Cl.
CPC .......... *G01S 7/4816* (2013.01); *G01S 7/4818* (2013.01); *G01S 7/4863* (2013.01); *G01S 7/4865* (2013.01); *G01S 17/10* (2013.01); *G01S 17/46* (2013.01)

(58) Field of Classification Search
CPC .... G01S 7/4816; G01S 7/4863; G01S 7/4818; G01S 17/10; G01S 17/46; G01S 7/4865
USPC ......................................................... 356/5.01
See application file for complete search history.

(56) References Cited

U.S. PATENT DOCUMENTS

| | | | | |
|---|---|---|---|---|
| 7,346,245 | B2 * | 3/2008 | Terakawa | A61B 1/00117 385/116 |
| 7,911,589 | B2 | 3/2011 | Siercks | |
| 2006/0202129 | A1 * | 9/2006 | Niclass | G01S 7/4863 250/370.14 |
| 2015/0338270 | A1 | 11/2015 | Williams et al. | |
| 2016/0349368 | A1 | 12/2016 | Stutz et al. | |

FOREIGN PATENT DOCUMENTS

| | | |
|---|---|---|
| EP | 1 832 897 B1 | 9/2007 |
| EP | 3 098 626 A1 | 11/2016 |
| EP | 3 206 045 A1 | 8/2017 |
| WO | 2008/009387 A1 | 1/2008 |

OTHER PUBLICATIONS

Extended European Search Report dated Dec. 15, 2017 as received in Application No. 171758683.

* cited by examiner

*Primary Examiner* — Daniel L Murphy
(74) *Attorney, Agent, or Firm* — Maschoff Brennan

(57) ABSTRACT

A distance measuring device comprising a sensor for highly accurate distance measurement with a very high dynamic range and range walk compensation, said sensor being provided by means of an array of single photon avalanche photodiodes.

25 Claims, 7 Drawing Sheets

DISTANCE MEASURING DEVICE WITH SPAD ARRAY AND RANGE WALK COMPENSENATION

CROSS-REFERENCE TO RELATED APPLICATIONS

This application claims priority to European Patent Application No. 17175868 filed on Jun. 13, 2017, which is incorporated herein by reference.

FIELD OF THE INVENTION

The invention relates to a distance measuring device for highly accurate distance measurement with a very high dynamic range and range walk compensation.

The optoelectronic distance measuring device according to the invention is suitable, for example, for distance and coordinate measuring machines in the fields of geodesy and industrial measurement, where LIDAR, laser trackers, tachymeters, laser scanners or profilers are typically used.

BACKGROUND

Various principles and methods are known in the field of electronic or electro-optical distance measurement. One approach consists in emitting pulsed electromagnetic radiation, such as e.g. laser light, toward a target to be measured and subsequently receiving an echo from said target as backscattering object, wherein the distance to the target to be measured can be determined for example on the basis of the time of flight, the shape and/or the phase of the pulse. Such laser distance measuring devices have in the meantime gained acceptance as standard solutions in many fields.

The backscattered pulse of a backscattered pulse sequence is detected mainly by the use of two different approaches or a combination thereof.

In the so-called threshold value method, a light pulse is detected if the intensity of the radiation incident on a detector of the distance measuring instrument used exceeds a certain threshold value. Said threshold value prevents noise and interference signals from the background from being incorrectly detected as a useful signal, i.e. as backscattered light of the emitted pulse.

What is problematic, however, is that in the case of weak backscattered pulses, such as are caused for example by relatively large measurement distances, detection is no longer possible if the pulse intensity falls below the detection threshold, i.e. below the threshold value. The major disadvantage of said threshold value method thus resides in the fact that the amplitude of the measurement signal has to be sufficiently greater than the noise amplitude of optical and electrical noise sources in the signal path in order to sufficiently minimize erroneous detections, with the result that for measurements at relatively large distances the threshold value method is suitable for use only to a limited extent.

The other approach is based on the sampling of the backscattered pulse. This approach is typically used in the case of weak backscattered signals (e.g. pulse signals), such as are caused for example by relatively large measurement distances. This method can also be regarded as integrated signal detection, wherein both the entire signal information and the significant noise information are detected by the sampling. This leads for example to an increase in the measurement accuracy. An emitted signal is detected by a procedure in which the radiation detected by a detector is sampled, a signal is identified within the sampled region and, finally, a position of the signal is determined temporally. By means of the use of a multiplicity of samples and/or summation of the reception signal synchronously with the emission rate, it is possible to identify a useful signal even under unfavorable circumstances, such that even relatively large distances or noisy background scenarios or background scenarios beset by interference can be dealt with.

Nowadays, often the entire waveform of the analog signal of the radiation detected by a detector is sampled here by means of the waveform digitizing (WFD) method. After identification of the coding of the associated transmission signal (ASK, FSK, PSK, etc.) of a received signal, a signal time of flight ("pulse time of flight") is determined very accurately from a defined profile point of the sampled, digitized and reconstructed signal, for example the points of inflection, the curve maxima, or integrally by means of an optimum filter known from time interpolation.

The limited linear modulation range of the electronic receiver circuit is problematic. In the near range, the signal can saturate the receiver, such that the coding of the transmission signal is no longer determined correctly or the time of flight is determined with insufficient accuracy.

A prohibitive disadvantage of signal sampling thus resides in the fact that in the state of saturated reception electronics as a result of excessively strong received light intensities, in particular at short distances or in the case of high reflectivity of the target object, appropriately evaluatable information of the measurement signal is no longer available since it is then no longer possible to ascertain an actual signal profile on account of detector saturation.

As an alternative or in addition to determining the pulse time of flight, a (fast) sampling is often also carried out with regard to pulses or pulse sequences that are coded or modulated in terms of amplitude, phase, polarization, wavelength and/or frequency.

By way of example, in the approach of temporally very precise sampling of the backscattered signal, the electrical signal generated by the detector is converted into a digital signal sequence by means of an analog-digital converter (ADC). This digital signal is subsequently usually processed further in real time. In a first step, said signal sequence is decoded by, that is to say identified, by specific digital filters and, finally, the position of a signature describing a time interval within the signal sequence is determined. Examples of time-resolving signatures are centroid, cosine transformation or for example amplitude-normalized FIR filters ("finite impulse response filter") with a weight coefficient set derived from the pulse shape. In order to eliminate possible distance drifts, a corresponding time-resolving signature is also compared from an internal start signal. In order to avoid irreversible sampling errors, additional digital signal transformations known to the person skilled in the art are applied.

One of the simplest types of modulation is the identification of the individual pulses or of the pulse sequences by distance coding, as described e.g. in EP 1 832 897 B1. This is used for example for the purpose of reidentifiability. This reidentification is necessary if an ambiguity arises, which may be brought about by various situations during the time-of-flight measurement of pulses, for example if more than one pulse or a group of pulses is situated between measuring instrument and target object. What is advantageous, in particular, is pulse coding for example in multi-beam systems consisting of a plurality of laser beams and assigned reception sensors.

In the threshold value method, in order to determine the reception time downstream of a threshold value discriminator a time-to-digital converter (TDC) is used. The latter is used to measure the point in time of the rising edge of the binary timing signal generated by the discriminator, wherein the timing signal is generated on the basis of a threshold value, for example. If only the emitted pulse has a Gaussian shape, for example, the part of the rising and falling edge which lies above the threshold value is increased with the received pulse strength. This means, therefore, that during a time measurement based on the rising edge, amplitude-dependent timing errors occur, which are typically referred to as "range walk" in the literature. In order to compensate for the range walk, therefore, for example amplitude information regarding a received pulse must be known.

A further cause of the "range walk" problem is concerned with the high linearity of the conventional photodetectors. The latter transmit the full dynamic range of the reception signal to the reception electronics, but the latter have a very limited linear modulation range. As a result, the transit time and thus the light time of flight to be determined are thus altered. Upon saturation of the receiver electronics, pulse deformations arise on account of nonlinear modulation behavior. The problem resides in the fact that the electronics do not cope with the wide dynamic range of the conventional photodetectors. Therefore, for example dynamic compression already in the photodetector would thus be advantageous.

SUMMARY

One object of some embodiments of the present invention consist in providing a distance measuring method or distance measuring device whereby the disadvantages known from the prior art are avoided, in particular wherein fast and precise measurements, for example with accuracies of smaller than 1 mm, are made possible both for short and for long distances and to objects with varying scattering properties.

A further object of some embodiments of the invention is furthermore an improved highly accurate distance measurement (<1 mm) both to diffusely scattering objects and to reflector targets.

A further object of some embodiments of the invention is to improve high-precision 3D scans on scenes with diffusely scattering surfaces, partly reflective or lustrous articles, reflection markings and retroreflectors, in particular in order to enable measurement rates in the megahertz range.

These objects are achieved by the realization of the characterizing features of the independent claims. Features that develop the invention in an alternative or advantageous manner can be gathered from the dependent patent claims.

Some embodiments of the invention relate to a distance measuring device, in particular for use in a handheld distance measuring instrument, laser tracker, tachymeter, laser scanner, LIDAR measuring instrument or profiler, for determining a distance to a target comprising a radiation source for generating a transmission radiation, in particular pulsed laser measurement radiation or superluminescence LED radiation, a transmission path for emitting at least one part of the transmission radiation to the target, a reception path comprising a receiver configured for detecting a reception signal on the basis of at least one part of the transmission radiation returning from the target, and a computing unit configured for deriving the distance to the target on the basis of the reception signal.

According to some embodiments of the present invention, the receiver for detecting the reception signal comprises an optoelectronic sensor based on an array of single photon avalanche photodiodes, referred to hereinafter as SPAD array, and the computing unit is configured to derive a signature parameter on the basis of the reception signal, wherein information regarding a signature of the signal profile of the reception signal is associated with the signature parameter, in particular wherein information regarding a characteristic-curve-specific triggering of the microcells of the SPAD array is associated with the signature, wherein on the computing unit, furthermore, distance correction information, in particular as a function or a lookup table, is stored regarding distance offsets which occur when deriving the distance and are dependent on the signal profile of the reception signal, and the computing unit, on the basis of the derived signature parameter and the distance correction information, takes account of a distance offset when deriving the distance.

In particular, the signature parameter comprises at least one of the following: a signal amplitude of the reception signal, a curve maximum of the reception signal, a pulse width of a pulse represented by the reception signal, a pulse shape of a pulse represented by the reception signal, in particular wherein the pulse shape is derived by means of spline interpolation or a resampling algorithm, a point of inflection of the reception signal, a maximum value of the gradient of the reception signal, and a maximum value of the curvature of the reception signal, for example wherein the point of inflection, the curvature and the gradient are detected in each case with respect to the rising and/or the falling edge, in particular wherein the distance correction information is a time offset—occurring when deriving the distance and dependent on the signal profile of the reception signal—of a time value with respect to a point in time of reception of the reception signal, which is functionally compared with the signature parameter when deriving the distance.

A further aspect of the invention relates to a distance measuring device, in particular for use in a handheld distance measuring instrument, laser tracker, tachymeter, laser scanner, LIDAR measuring instrument or profiler, for determining a distance to a target comprising a radiation source for generating a transmission radiation, in particular pulsed laser measurement radiation or superluminescence LED radiation, a transmission path for emitting at least one part of the transmission radiation to the target, a reception path comprising a receiver configured for detecting a reception signal on the basis of at least one part of the transmission radiation returning from the target, referred to as reception radiation below, and a computing unit configured for deriving the distance to the target on the basis of the reception signal.

In accordance with this aspect of the invention, the receiver for detecting the reception signal comprises an optoelectronic sensor based on an array of single photon avalanche photodiodes, referred to hereinafter as SPAD array, wherein the computing unit is configured to derive an amplitude of the reception signal, in particular wherein the amplitude is derived directly from the curve maximum of the reception signal, wherein on the computing unit, furthermore, distance correction information, in particular as a function or a lookup table, is stored regarding distance offsets which occur when deriving the distance and are dependent on the amplitude of the reception signal, and wherein the computing unit, on the basis of the distance correction information, takes account of a distance offset derived from the amplitude of the reception signal when deriving the distance.

In particular, the distance correction information provides shape information regarding a signal shape of the reception signal (14, 14'), said signal shape being dependent on the photocurrent density of the reception radiation, in particular regarding a temporal shift of a curve maximum of the reception signal, said temporal shift being dependent on the photocurrent density of the reception radiation. For example, the temporal shift is furthermore dependent on the number of microcells or more precisely on the ratio of the number of microcells present on the SPAD array to the number of incident photons.

Arrays of single photon avalanche photodiodes, also called SPAD arrangement or SPAD arrays, are generally arranged as a matrix structure on a chip. The arrays or chips having a photosensitivity in the visible and near infrared spectral range are also referred to as SiPM (silicon photomultiplier). The SiPMs are gradually superseding the photomultiplier tubes used hitherto, in particular in the visible and near ultraviolet spectral range. SiPMs have a high spectral sensitivity in the visible wavelength range. By way of example, SPAD arrays which are sensitive right into the near infrared range to a wavelength of far above 900 nm are available in the prior art.

The special feature of said SPAD arrays is the high gain thereof; therefore, hitherto they have been used for example in the case of very weak optical signals where just 1 to 50 photons impinge on the sensor. Such airborne sensors are also referred to as SPL LIDAR (SPL="single photon lidar"). With only a few photons, the distance noise is considerable, however, and is typically 10 mm to 100 mm. By contrast, the present inventive device enables measurements with a distance noise of far less than 1 mm. For example, a measurement accuracy of 0.1 mm is made possible, which corresponds to a typical time resolution of one picosecond or less. This high measurement accuracy is achieved by measures that are described further below.

Commercial SPAD arrays are also available at wavelengths of between 800 nm and 1800 nm. These sensors principally consist of the semiconductor material InGaAs. These sensors, too, have an external or internal matrix structure over the photosensitive area, depending on the design. Distance measuring systems comprising SPAD arrays in this spectral range have the advantage, for example, that the solar background light (daylight) is considerably lower by comparison with the visible wavelength range and that, as a result, this disturbing luminous flux impairs a signal detection by means of SPAD arrays to a lesser extent.

The special feature of these SPAD array sensors is the very high photosensitivity, wherein the SPAD arrays are principally designed to be able to detect single photons in an entirely satisfactory manner. Therefore, they are also referred to as "multi-pixel photon counter" (MPPC). The SPAD arrays consist of hundreds or thousands of microcells, wherein the microcells are connected in parallel with one or more output signals and are thus able to simultaneously receive thousands or hundreds of thousands of photons. Moreover, even with solar background light there are still enough free cells present for the signal photons.

In contrast to the comparatively expensive photomultiplier tubes having high time jitter, the modern SiPM sensors are cost-effective and have time jitter in the picoseconds to sub-picoseconds range. Moreover, the SiPM arrays are fabricated by means of a conventional CMOS technology process, which additionally enables the integration of electronic components and circuits. Furthermore, SPADs and SPAD arrays have a low breakdown voltage ("break voltage"), for example, by comparison with conventional APDs. In the case of silicon SPADs, said voltages are 25-50 V, for example, which simplifies the driving. The same comparably applies to the SPAD arrays composed of the semiconductor material InGaAs.

The high photosensitivity is attributable to the avalanche mechanism, wherein the individual microcells of the array are operated for example in the overvoltage range ("reverse voltage beyond the break voltage"), that is to say above the breakdown voltage (break voltage) at which a single photon triggers an avalanche of electrons, as a result of which the signal is amplified greatly depending on the setting, e.g. a gain up to a factor of one million. The current assigned to the photon, owing to its intensity, can easily be converted into a voltage signal and fed to a signal evaluation unit without significant amplification.

A SPAD array is able to receive a plurality of photons simultaneously, wherein the currents of the many microcells on the sensor chip can be added and subsequently be converted into a voltage signal for example via a resistor or a transimpedance amplifier. The SPAD array can be configured for example in such a way, e.g. with more than ten thousand microcells, that it behaves like an analog photosensor, wherein the characteristic curve for example in the case of weak reception signals is approximately proportional to the intensity of the incident laser pulse.

In the literature, a distinction is drawn between SPAD array operations in the linear mode, Geiger mode and SPL mode (SPL, "single photon lidar").

In the linear mode below the breakdown voltage, a reverse-voltage- and temperature-dependent amplification occurs and SPAD arrays can be used for example for constructing high-sensitivity photoreceivers with a radiation-power-proportional output voltage.

In the Geiger mode and SPL mode, i.e. in each case during operation above the breakdown voltage, it is possible to use SPADs and SPAD arrays for single photon counting. In the case of the SPADs, in the Geiger mode each individual pixel generates an output signal, wherein the electron avalanche is triggered by exactly one photon. If a photon packet composed of a plurality of photons arrives, then a larger signal is not measured. Therefore, no amplitude information is present.

In the Geiger mode, an incident photon packet generates only one (binary) event signal, which is not proportional to the number of photons in the photon packet.

SPL mode is understood to mean a SPAD array operated in the Geiger mode, wherein many microcells are connected in parallel with an output signal. In the case of arriving photon packets having only a few photons, the individual avalanches are added practically linearly and the amplitude of the output signal is therefore proportional to the number of detected photons.

The recovery time of the microcells after a photonic trigger is not zero, but rather for example between 5-50 nanoseconds, as a result of which the apparent sensitivity of the SPAD array to subsequently arriving photons is reduced. However, this has the advantage, for example, that the sensor can detect a signal strength range with a high dynamic characteristic. This nonlinearity is monotonic in the case of SPAD arrays having a large number of microcells (>1000) and leads firstly to an amplitude compression between input signal and output signal and secondly, as the input signal becomes larger, to an output signal that increases to an attenuated extent. It is interesting that the output signal of SPAD arrays having a high number of microcells (>1000) does not saturate completely, such that an amplitude change is measurable even in the case of a reception pulse having a very high number of photons of far above one million.

A SPAD array having a sufficient number of cells detects the reception signal amplitude over a large dynamic range and as it were compresses the input amplitude of very small to very large signals. The SPAD array never overdrives, not even in the case of very large signals, e.g. not even if the radiation is reflected back from an angularly precise retroreflector. In the case of a number of photons of $10^9$, the output signal of the SPAD array asymptotically approaches a maximum limit voltage which is adapted to the downstream amplifier circuit and guarantees that the downstream electronics as far as the time measuring circuit are never overdriven. As a result, an accurate distance measurement over a high dynamic range is possible in the first place.

During the laser distance measurement to different distances and varying surfaces, the number of photons can vary for example from less than 10 to above $10^9$. By contrast, SPAD arrays have a compression factor of the measured signal amplitude which is at least $10^4$, typically $10^8$, with respect to the actual signal amplitude. SPAD arrays can therefore be used to measure both to black diffuse targets and to retroreflectors, without the reception unit requiring signal regulation. As a result of the high gain, moreover, SPAD arrays have for example little noise and SPAD arrays having a high filling factor exhibit a signal-to-noise ratio (SNR) suitable for distance measurements. The more microcells a SPAD array has, the greater the SNR.

As a result of the large provided dynamic range of the SPAD array, e.g. from single photon counting right into a range where conventionally used sensors overdrive, the effective amplitude of the reception signal is thus in each case explicitly contained in the detected signal independently of the returning signal intensity and need not be derived for example via secondary signal features, for example a pulse width. As a result, the signal processing and also the determination and, if appropriate, compensation of a range walk simplified and accelerated. In particular, the abovementioned limitations of the threshold value method and of the WFD method can thus largely be overcome. In particular, therefore, it is however possible to achieve already with a threshold-value-based discriminator circuit that is comparatively simple in its implementation a distance measuring accuracy the same as or better than that achieved for example with comparatively more complex amplifier circuits consisting of adjustable gain stages or logarithmic components.

One embodiment of the invention therefore relates to the fact that the computing unit is configured to derive, on the basis of a threshold value being passed by the reception signal, a time value with respect to a point in time of reception of the reception signal, and to derive, on the basis of the distance correction information and the signature parameter, in particular the amplitude, of the reception signal, a time offset—occurring when deriving the time value—of the time value with respect to the actual point in time of reception of the reception signal detected by means of the time value, wherein the computing unit takes account of the time offset when deriving the time value.

In particular, the distance correction information comprises at least one of the following: a lookup table which enables a correlation between values of a parameter used for deriving the distance, for example a time offset or a distance offset, and values of the signature parameter, in particular amplitude values, of the reception signal, and a function which outputs on the basis of values of the signature parameter, in particular amplitude values, of the reception signal as function parameter values of a parameter used for deriving the distance, for example a time offset or a distance offset.

Distance correction information can be obtained from the functional relationship between the distance offsets and signatures of the pulse shape. For example in the case of TDC time measuring circuits from the pulse width or from the steepness of the rising edge, or in the case of WFD time measuring circuits from the curve maximum, the amplitude at the point of inflection, maximum value of the gradient, maximum value of the curvature, in particular of the rising edge, etc. What is important is that the functional relationships between distance offset (range walk) and the signature obtained from the pulse are monotonic.

The laser signals of a distance measuring device are generally subjected to pulse coding. Typical pulse rates are between kHz and GHz. Experiments have shown that such signals can be received well with SPAD arrays at voltages in overbreak operation. Even pulse packets (bursts) are able to be received unambiguously and almost without noise with SPAD arrays. This is the case for example even if the recovery time of the microcells is very long with a value of ten nanoseconds. On account of the analog construction of SPAD arrays, even a photocurrent present as a result of ambient light, for example, can be received. The laser signal is then superimposed on the electric photocurrent of the ambient light. For example, the current surge generated by the laser pulse at the output of the SPAD array is subjected to high-pass filtering in order that the slow trailing signal edge is shortened. The output pulse thus becomes a short signal pulse, e.g. having a pulse duration of less than one nanosecond. Such short pulses having steep edges are suitable for a precise time and hence also distance measurement.

One embodiment relates to the fact that the distance measuring device comprises a reception circuit having a differentiator, in particular an electrical high-pass filter.

Without a differentiator, e.g. a high-pass filter, the output signal of a SPAD array substantially has the form of a step function having a very steep rise (<200 ps) and a slow fall (>>10 ns). With an electrical differentiating unit, for example, the advantages of a short pulse shape are afforded and the rate of rise of the rising edge of the SPAD response transitions to a pulse width, as a result of which for example a pulse width measurement is made possible. The stronger the laser pulse, the steeper the rising edge before the high-pass filter (differentiator), as a result of which the pulse width becomes amplitude-dependent after the differentiation. By way of example, range walk compensation is possible as a result. However, the use of a differentiator has no influence on the recovery time of the SPAD array.

Furthermore, initial realization attempts to integrate more electronic functionality into the SPAD arrays have already been undertaken. By way of example, each microcell has already been assigned time measuring circuits ("TOF circuitries"). The latter measure the time of flight (TOF). SPAD array implementations exist, for example, wherein precise photon counting is integrated near to the microcells, said photon counting managing without an analog-digital converter (ADC) connected downstream. Moreover, a respective time measuring circuit (TDC, "time-to-digital converter") can be integrated for example in the case of each microcell. Furthermore, a digital interface, for example, is used as output of the SPAD array. Such components are fully digital and do not need. "mixed signal processing" during CMOS production.

A further embodiment of the invention relates to the fact that the distance measuring device comprises a reception circuit configured for processing the reception signal and for providing at least one of the following: waveform digitizing of the reception signal with time resolution having sub-picosecond accuracy, a time measuring circuit having a time-to-digital converter, and a phase measurement of the reception signal with respect to a transmission signal provided by the transmission radiation.

In the case of multi-channel distance measuring units (parallelization of distance measurements), consisting of a multi-beam emitter and receiver, for example TDC time measuring circuits in an FPGA ("field programmable gate array") are suitable as a very compact and likewise parallelizable evaluation unit. With a TDC it is furthermore possible to carry out a pulse width measurement, but not an amplitude measurement. An amplitude measurement requires an additional measuring unit, for example. By contrast, by means of waveform digitizing (WFD), for example, a higher time resolution than with previous TDCs and additionally a simple amplitude measurement are possible.

A further embodiment of the invention is in particular characterized in that the reception circuit and the computing unit are configured in such a way that the amplitude of the reception signal is derived on the basis of at least one of the following: a curve maximum of the reception signal, a point of inflection of the reception signal, a maximum value of the gradient of the reception signal, in particular of the rising edge, a maximum value of the curvature of the reception signal, in particular of the rising edge, a difference in curvature with respect to two positions in the rising and/or the falling edge of the reception signal, a pulse width of a pulse represented by the reception signal, a pulse shape of a pulse represented by the reception signal, in particular wherein the pulse shape is derived by means of spline interpolation or a resampling algorithm.

A further embodiment of the invention is characterized in that the SPAD array is configured in such a way that it has at least one of the following properties: a photosensitivity for wavelengths between 300 nm and 1100 nm, in particular wherein the SPAD array is based on a silicon receiver, a photosensitivity for wavelengths between 700 nm and 2000 nm, in particular where the SPAD array is based on an InGaAs, Ge, PbSe or MCT receiver, and an overbreak operating mode.

Firstly, there is furthermore interest for example in as far as possible all the microcells of a SPAD array being fed a uniform signal radiation, as a result of which the SPAD array behaves similarly to an avalanche photodiode (APD) in the linear mode. Secondly, SPAD arrays exhibit a so-called misaiming diagram, wherein the time of flight of the signal response is dependent on the position of the light spot on the SPAD array. By way of example, the microcells at the edge of the SPAD array are slower than those in the center. This time of flight effect can be averaged out by a uniform illumination of all the microcells. Suitable light mixers are optical waveguides, in particular, because no light is lost through them.

One embodiment therefore relates to the fact that the reception path is configured for light mixing by means of fiber coupling, such that returning parts of the transmission radiation are distributed uniformly over the SPAD array, in particular wherein the light mixing is based on at least one of a diffuser, a fiber-optic optical waveguide rod, an optical waveguide with scrambler, a square fiber, a light funnel, a diaphragm, and a defocusing.

A further special feature of SPAD arrays consists for example in the fact that individual subsets of microcells are activatable separately. A temporally different activation of individual subsets of microcells, for example alternately the even and the odd rows of a SPAD array, leads for example to a shortening of the recovery time of the SPAD array, as a result of which a faster laser modulation or shot rate is possible.

In accordance with one embodiment, the SPAD array comprises a multiplicity of microcells and is configured in such a way that the microcells are readable individually and/or in microcell groups and a first set of individually readable partial regions of the SPAD array is thereby definable. Readable means that the microcells or the microcell groups have a signal output that permits the determination of the time of flight in picoseconds or sub-picoseconds. The computing unit is furthermore configured for controlling the receiver on the basis of a preprogrammed measurement sequence for detecting the reception signal, wherein the measurement sequence defines the detection of the reception signal by means of a defined temporal sequence of read-outs of individual partial regions of the first set of partial regions.

Individual subsets of microcells can furthermore be driven and/or read separately. As a result, by way of example, an arrangement of this type is possible wherein only a few microcells, e.g. a column in the center of the SPAD array, are driven in the linear range (operation voltage<break voltage), wherein the amplitude of the reception signal is detected even in the case of high overdriving, with a comparatively higher (time and/or amplitude) resolution than with other microcells driven above the breakdown voltage. As a result, by way of example, a precise amplitude measurement is possible both in the lower and in the upper signal range, as a result of which an accurate compensation of the range walk error is also made possible.

In accordance with a further embodiment, the SPAD array comprises a multiplicity of microcells and is configured in such a way that the microcells are readable individually and/or in microcell groups, wherein the SPAD array is furthermore configured in such a way that a second set of individually readable partial regions of the SPAD array is defined, wherein the partial regions of the second set of partial regions are configured in each case in such a way that they are operated in a linear detection mode below the breakdown voltage, and that a third set of individually readable partial regions of the SPAD array is defined, and the partial regions of the third set of partial regions are configured in each case in such a way that they are operated in an overbreak mode above the breakdown voltage.

By means of a picosecond laser, by way of example, a low time jitter and a smaller amplitude-dependent range walk (distance offset vs. reception signal amplitude) are achieved. As mentioned, the output signal of the SPAD array downstream of a high-pass filter has a duration of e.g. a maximum of one nanosecond. The excitation of the SPAD array by means of a laser is thus preferably carried out for example in a manner significantly shorter than this signal response. As a result, the temporal centroid of the output signal becomes practically amplitude-independent, as a result of which the variation of the systematic distance offset (range walk) is also minimized.

In accordance with one embodiment of the invention, the radiation source is configured to provide the transmission radiation as pulsed laser measurement radiation, in particular having an individual pulse duration of less than 600 picoseconds.

Furthermore, in accordance with a further embodiment, the receiver can comprise a plurality of SPAD arrays, wherein the plurality of SPAD arrays are arranged one-dimensionally or two-dimensionally with respect to one another, in particular wherein each SPAD array comprises separate drive electronics and/or evaluation electronics. Often in the case of such arrangements of SPAD arrays (SPAD arrangements), the individual arrays are referred to as pixels, even though each of these pixels themselves consists of hundreds to tens of thousands of microcells.

The system according to the invention and the laser distance measuring device according to the invention are described in greater detail purely by way of example below on the basis of exemplary embodiments illustrated schematically in the drawings. Identical elements are identified by identical reference signs in the figures. The embodiments described are generally not illustrated in a manner true to scale, nor should they be understood as a restriction.

BRIEF DESCRIPTION OF THE DRAWINGS

In specific detail.

DETAILED DESCRIPTION

Figure 1A:
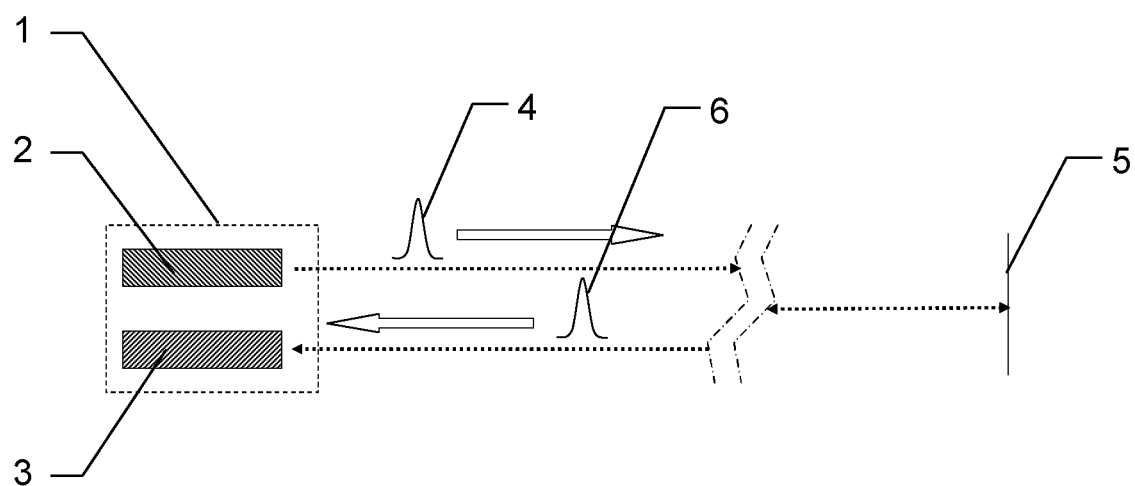
FIGS. 1a,b: show a basic illustration of an electro-optical distance measuring device according to the pulse time-of-flight principle.

FIG. 1a shows a basic illustration of an electro-optical distance measuring device 1 from the prior art according to the pulse time-of-flight principle. A transmitter 2 and a receiver 3 are arranged in the distance measuring device 1. The transmitter 2 emits a light pulse 40, which after reflection or backscattering at a target 5, e.g. a cooperative target such as, for example, a retroreflector or an uncooperative target such as, for example, a natural surface, is detected again as a returning light or radiation pulse 60 with the receiver 3. Instead of the light pulses, by way of example, a continuously modulated transmission signal can also be used according to the invention.

Figure 1B:

As shown in a basic illustration in FIG. 1b, the distance is determined from the time of flight T as the temporal difference between the start point in time of the emission of a light pulse 40 and the point in time of reception of the returning light pulse 60. In the case of a linear photodiode, for example an APD operated diode in the linear mode, the optical signal 60 is converted into a proportional signal 6. The point in time of reception of the signal 6 is determined in this case by the evaluation of a feature of the signal pulse s(t), e.g. by the passing of a signal threshold or by centroid determination of the integrated pulse profile. In the threshold value method, other methods for measuring the time of flight T can also be utilized, such as, for example, the conversion of the reception signal into a bipolar signal and subsequent determination of the zero crossing.

Figure 2A:
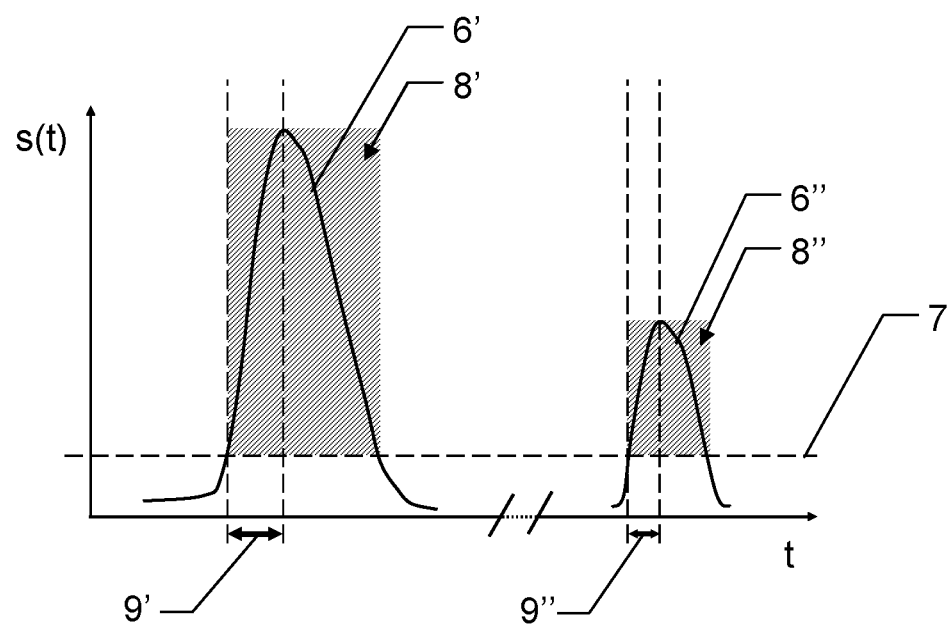
FIG. 2a: shows a schematic illustration of a distance offset (range walk) that arises in a threshold value method according to the prior art (APD in the linear mode)

FIG. 2a shows a threshold value method for received signals 6', 6" according to the prior art. In order to suppress shot noise, pulse noise, background components or systematic interference signals such as, for example, as a result of the optical and electrical crosstalk between transmitter signal path and receiver signal path and to exclude them from detection, a detection threshold 7 is used. Signal strengths s(t) below said detection threshold 7 do not lead to a response of the receiving unit, which generates a stop signal, as a discriminator and thus do not lead to a detection. If the intensity of the signal s(t) exceeds the detection threshold 7, the detection and thus the generation of the stop signal and the registration of the point in time of reception take place. The output signal provided by the threshold value method is thus dependent on the detection threshold 7 being reached or exceeded by the received or the input signal.

However, if the signal strength s(t) always remains below the detection threshold 7, then no response of the discriminator occurs and the signal is not detected.

The threshold problem of the threshold value method occurs for example during measurement toward weakly reflective targets or in the case of high optical/electrical crosstalk.

If the emitted pulse then has a Gaussian shape, for example, the part of the pulse 8', 8" which lies above the detection threshold 7 is shifted, thus giving rise to a variable temporal offset 9', 9" between the registration of the point in time of reception and for example the temporal position in respect of the pulse amplitude (of the highest intensity value of the pulse 6', 6"). This means, therefore, that in the case of a time measurement based on the rising edge, amplitude-dependent timing errors occur, which are typically referred to as "range walk" in the literature.

In order to compensate for the range walk, therefore, for example amplitude information or some other signature for describing the strength of the returning optical signal 60 must be known.

The pure threshold value method thus usually ensures lower distance determining accuracies than the sampling method (WFD principle) mentioned below.

Figure 2B:
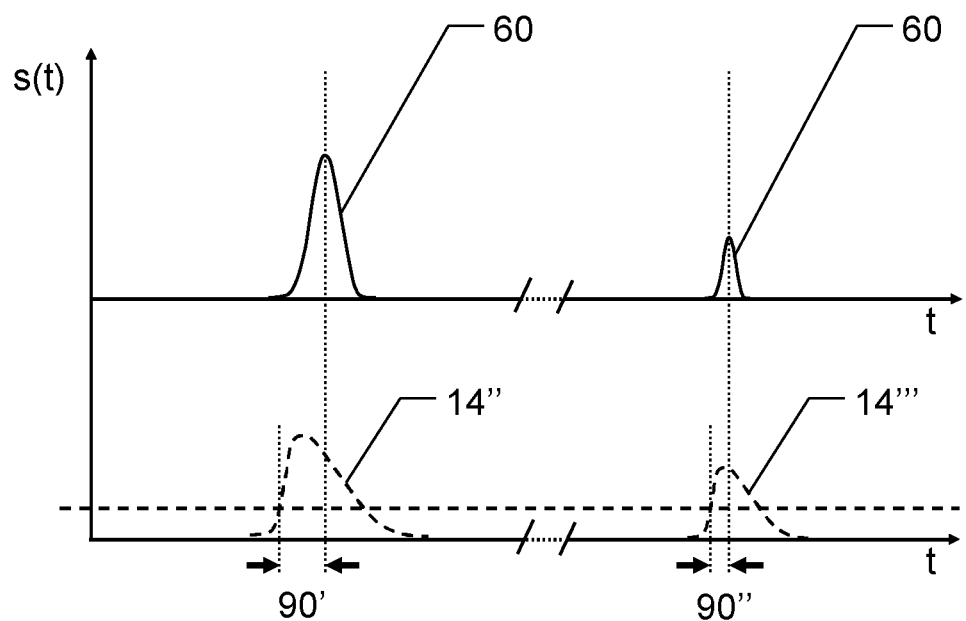
FIG. 2b: shows a schematic illustration of a distance offset (range walk) in a threshold value method with a SPAD array in the overbreak mode.

FIG. 2b shows a further schematic illustration of a distance offset (range walk) that occurs in a threshold value method with SPAD array in the overbreak mode. The arriving optical pulses 60 are received by a SPAD array and converted into a current or voltage signal V(t) 14", 14'". In a manner comparable to FIG. 2a, a variable temporal offset

90', 90" is ascertained, which is dependent on the amplitude of the response signal of the SPAD array. A correction of the range walk is therefore necessary for an accurate time-of-flight or distance measurement.

Figure 3A:
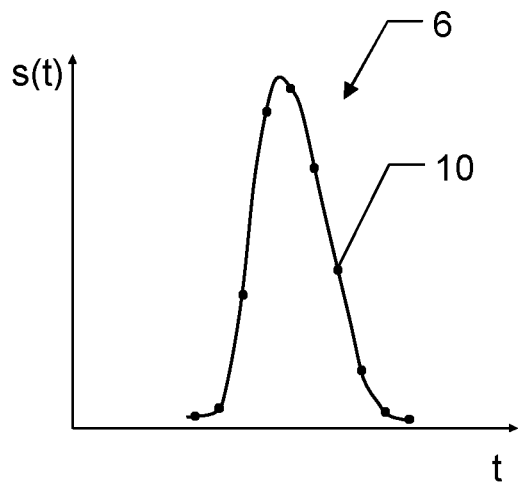
FIGS. 3a,b: show a schematic illustration of the WFD principle and the saturation problem in this regard with an APD operated in the linear mode.

FIG. 3a illustrates the principle of a sampling method (WFD) for backscattered light signals 60 according to the prior art. The received light signal is converted into an electrical signal 6 for example by an APD ("avalanche photodiode") operated in the linear range. This analog signal 6 or the signal profile s(t) thereof is sampled at various points in time 10 or in assigned time intervals, such that the signal shape s(t) can be derived from this sampling (digitizing).

Figure 3B:
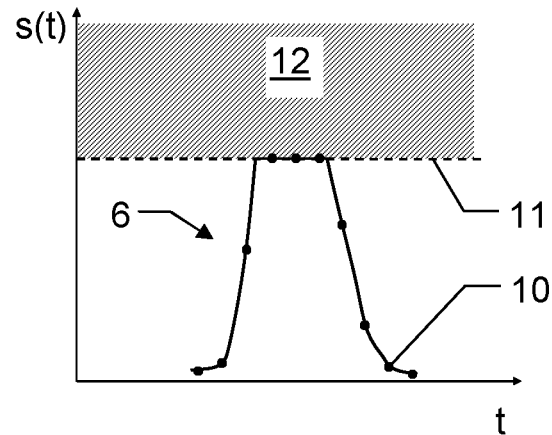

Since the APD is operated in the linear range, variations of the optical signal strength of more than four orders of magnitude are possible for example in the case of laser scanners. In order to be able to detect large variations of the signal pulse s(t), at the receiver end a high dynamic characteristic is required, which allows the complete detection or sampling of the signal 6 supplied by the photodiode. Otherwise the situation illustrated in FIG. 3b can occur in which parts of the signal 6 lie outside the dynamic range and a saturation problem of the sampling method occurs. Above a saturation limit 11 there exists a saturated region 12 of the amplifier electronics, in which no expediently utilizable samples 10 of the pulse 6 are available. The sampling of the signal 6 is then substantially restricted to the range lying below the saturation limit. Particularly in the case of a high edge steepness, a determination of the signal shape and, for example, of the amplitude position is then difficult.

Figure 4A:
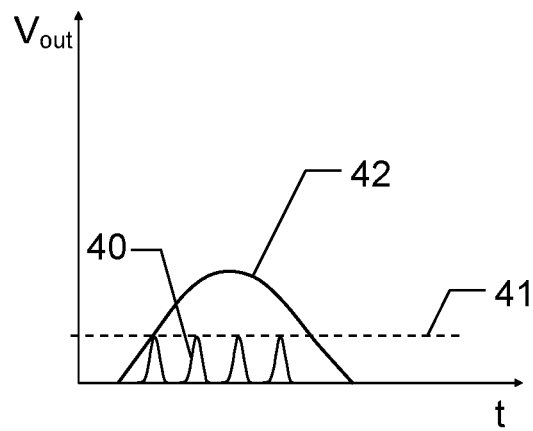
FIGS. 4a,b: show a schematic illustration of a distance offset (range walk) in a phase or WFD method with a SPAD array in the overbreak mode.
Figure 4B:
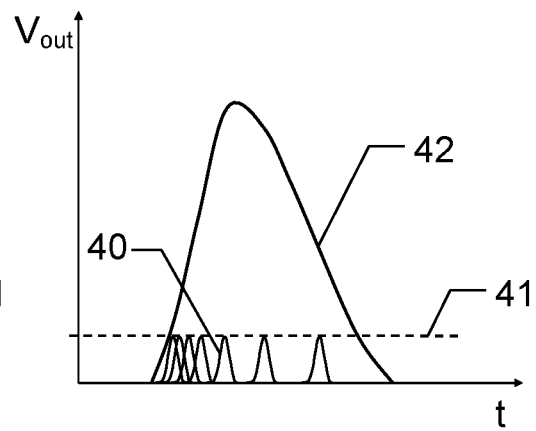

FIGS. 4a and 4b illustrate the arising of a distance offset (range walk) during a phase or WED distance measuring method with a SPAD array in the overbreak mode.

FIG. 4a shows the response signal $V_{out}$ of the SPAD array in the case of only a few incident photons. Individual photons are represented indirectly via the current or voltage pulses 40 of the microcells activated by electron avalanches. The shortest possible laser pulses of less than 1000 ps, preferably <100 ps, are always presupposed in each case. The triggering of the microcells occurs in more or less regular time intervals with low photocurrent density. Each triggered or activated microcell generates a partial signal pulse having the magnitude 41. A temporal curve 42 results therefrom as the sum of all the partial signals of the triggered microcells, which corresponds to the response signal $V_{out}$ of the SPAD array.

FIG. 4b shows the response signal $V_{out}$ of the SPAD array in the case of a strong or very strong incident laser pulse on the SPAD array. Very many microcells are triggered already upon die leading edge of the incident laser pulse, as a result of which for example the shape of the signal 42 changes, in particular wherein the centroid of the signal 42 shifts toward the left to shorter times, which corresponds to a signal-dependent range walk. This temporal shift is therefore also dependent on the number of microcells or more precisely on the ratio of the number of microcells present on the SPAD array to the number of incident photons. The greater said ratio, the smaller the temporal offset (range walk).

Figure 5:
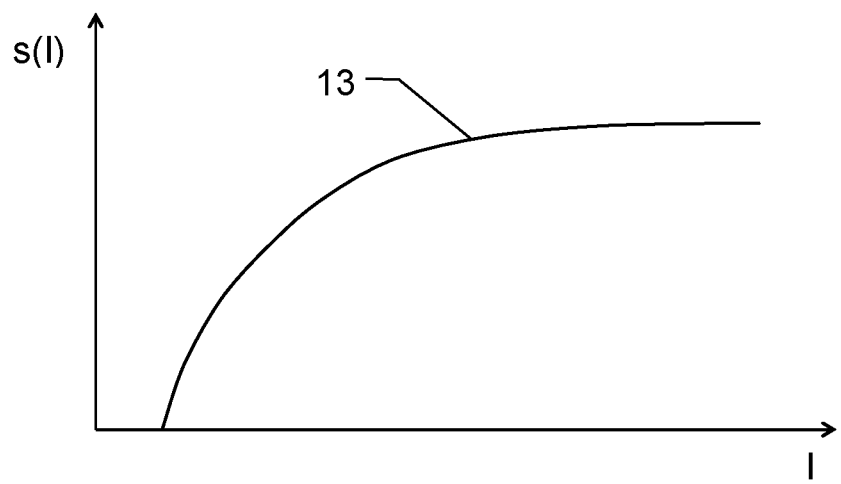
FIG. 5: shows a schematic illustration of a characteristic curve of a SPAD array.

FIG. 5 shows by way of example a characteristic curve 13 of a SPAD array. The SPAD array detects the reception signal intensity I over a large dynamic range and compresses as it were the input intensity of very small to very large signals. The SPAD array never overdrives, not even in the case of very large signals, e.g. not even if the radiation is reflected back from an angularly precise retroreflector.

Therefore, by comparison with a photodiode or APD, operated below the break voltage, the SPAD array has the advantage that the dynamic range of the photonic input signal in comparison with the electrical output signal is compressed by orders of magnitude already on the photosensor. The signal amplitude s(I) generated increases substantially logarithmically with the arriving reception signal intensity I. The SPAD array combined with simple reception electronics can therefore be used over a very large dynamic range. For example, a SPAD array having 3000 microcells, for example, can detect a signal dynamic characteristic of more than a factor of $10^8$ and still measure the amplitude of a returning pulse 60 (see FIG. 1a) sufficiently accurately.

With SPAD arrays it is therefore possible to measure both to uncooperative targets, e.g. black diffuse surfaces, and to cooperative or greatly reflective targets, without the receiving unit requiring signal regulation. As a result of the high gain, moreover, SPAD arrays have low noise and SPAD arrays having a high filling factor exhibit a signal-to-noise ratio that is well suited to distance measurements.

Figure 6:
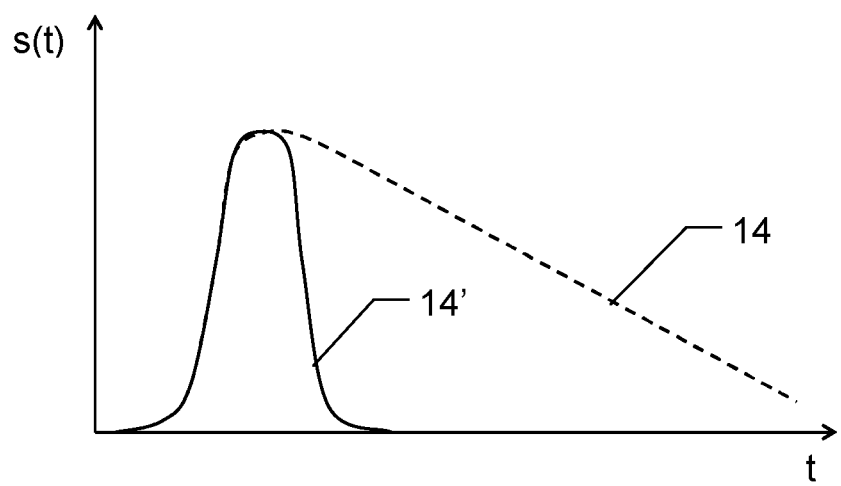
FIG. 6: shows an exemplary reception signal of a SPAD array for a detected signal pulse.

FIG. 6 shows by way of example an output signal 14 of a SPAD array for a detected signal pulse. The recovery time of the microcells after a photonic trigger is not zero, but rather for example between 5-50 nanoseconds. Without a differentiator, e.g. a high-pass filter, the output signal 14 of a SPAD array substantially has the form of a step function having a very steep rise, e.g. less than 200 picoseconds, and a slow fall, e.g. greater than 10 nanoseconds.

By means of an electrical differentiating unit, the current surge generated by the laser pulse at the output of the SPAD array can be subjected to high-pass filtering, for example, whereby the slow trailing signal edge is shortened. By way of example, a signal shape 14 corresponding to a pulse having a short pulse duration and steep edges can thus be generated.

For example, the SPAD array is then excited with a laser pulse that is significantly shorter than the signal response of the SPAD array, as a result of which the temporal centroid of the output signal—and correspondingly for example the pulse width of the signal 14' after differentiation—is practically amplitude-independent, as a result of which the variation of the systematic distance offset (range walk) is also minimized. However, the use of a differentiator has no influence on the recovery time of the SPAD array of approximately 10 nanoseconds, for example.

Figure 7:
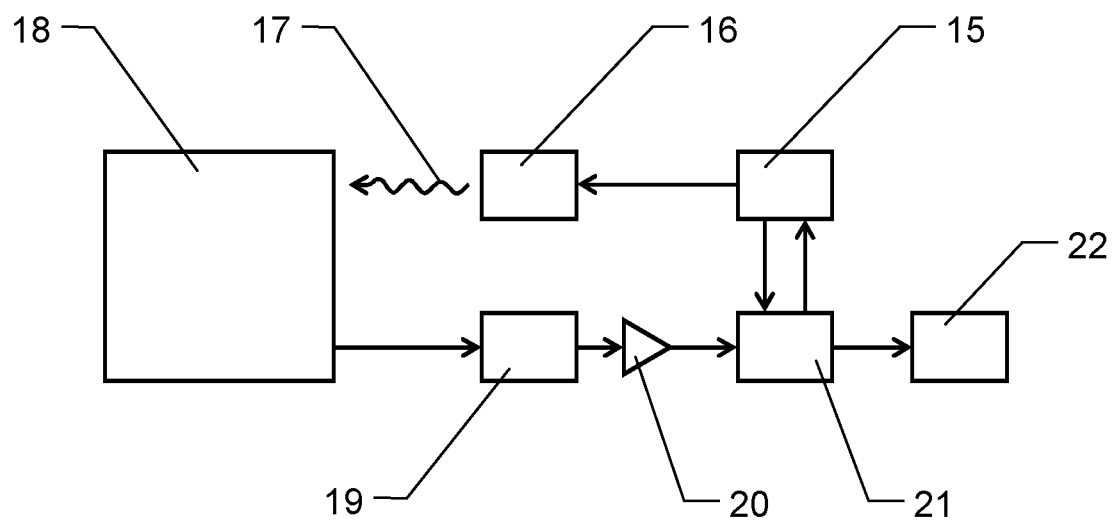
FIG. 7: shows an exemplary circuit for an inventive distance measurement by means of a combination of a sensor based on at least one SPAD array with waveform digitizing (WFD)

FIG. 7 shows by way of example a circuit for an inventive distance measurement by means of a combination of a sensor based on a SPAD array with waveform digitizing (WFD).

For example, the inventive distance measuring device comprises a laser 16 driven by a control unit 15 and serving for emitting a pulsed laser measurement radiation 17, which, after reflection or backscattering at a target (not shown), impinges as reception radiation on a detector have a SPAD array 18. The detector can be provided for example as a "single-pixel receiver" or as a "multi-pixel receiver". In the case of a "multi-pixel receiver", a plurality of signal outputs are present by virtue of subsets of all the microcells being combined to form a respective associated output signal.

The at least one (analog) reception signal generated by the SPAD array 18 is fed to a differentiator 19, e.g. a high-pass filter, and is subsequently forwarded, for example via an amplifier 20, to a waveform digitizing unit 21, as a result of which a high time resolution and a determination of parameters such as, for example, pulse width, pulse shape and signal amplitude are made possible. The range walk can be compensated for on the basis of at least one of these parameters.

One embodiment of waveform digitizing (WFD) is based for example on a combination of an initial measurement signal detection on the basis of the threshold value method with signal sampling with downstream signal processing for precise identification of the amplitude of the measurement signal.

For example, the measurement signal detection is carried out by means of an (in particular analog) comparator stage for generating a comparator output signal depending on a criterion being satisfied by the incoming measurement signal.

Alternatively, the signal can also be sampled and recorded during the entire time duration between two transmission pulses and then be processed on an FPGA.

The signal sampling can be carried out for example by means of an ADC digitizing stage (ADC, "analog-to-digital converter"), wherein, with a defined sampling rate, an input signal fed to the digitizing stage is sampled and a conversion into sampled digitized values is thus carried out.

The amplitude or some other signature that characterizes the reception signal strength of the measurement signal can thus be derived from the WFD sampling, as a result of which for example the range walk effect can be compensated for, for example by means of previously or currently newly determined lookup tables, determined by means of a, for example instrument-internal, reference distance.

The derived signal shape can furthermore be compared for example with an ideal signal shape stored in the instrument or determined via the instrument-internal reference light path, in order for example to derive and take account of pulse deformations, for example caused by geometric properties and reflection properties of the surface of the target object, e.g. angle of incidence or type of surface.

The compensated distance measurement data are then transmitted to a storage unit 22 and made available to a user, for example.

Figure 8:
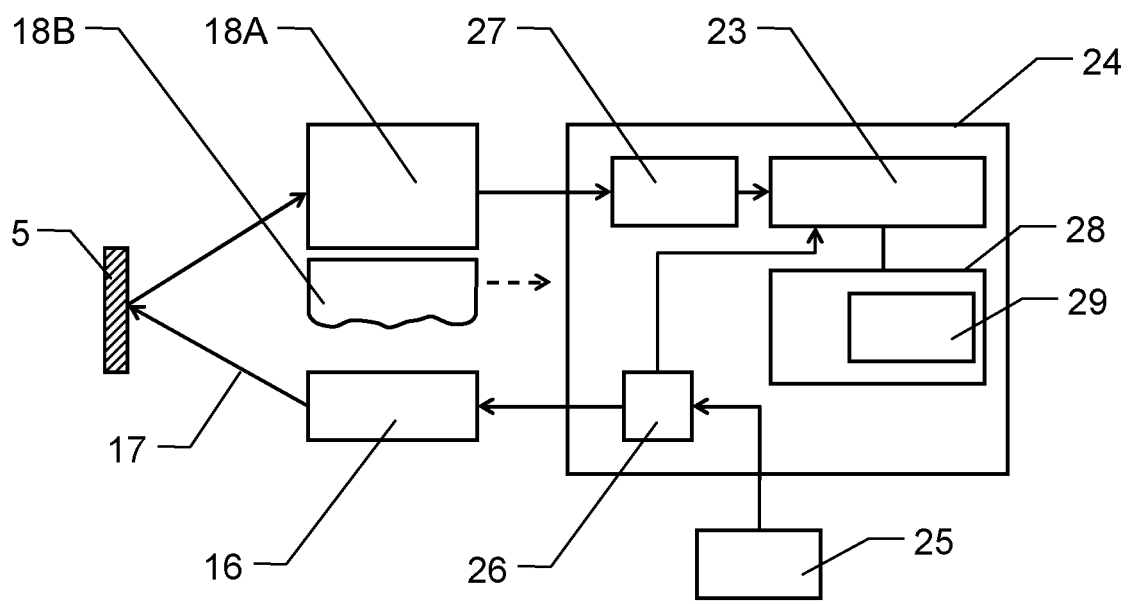
FIG. 8: shows an exemplary circuit for an inventive distance measurement by means of a combination of a sensor based on one or more SPAD arrays with a TDC time measuring circuit implemented in an FPGA.

FIG. 8 shows by way of example a circuit for an inventive distance measurement by means of a combination of a sensor based on one or more SPAD arrays 18A, 18B with a time measuring circuit consisting of a TDC time measuring circuit 23 ("time-to-digital converter") implemented in an FPGA 24 ("field programmable gate array").

Owing to their high and low-noise signal amplification, SPAD arrays are suitable for example for multi-channel arrays (multi-beam). By way of example, in the case of multi-channel distance measuring devices, consisting of multi-beam emitter configured for a parallelization of the distance measurements, and receiver, a TDC time measuring circuit in the FPGA is suitable as a compact and likewise parallelizable evaluation unit.

With the use of a TDC as time measuring circuit, the detection of the signal amplitude is not possible in a straight-forward manner. As a further parameter, however, the pulse width of the differentiated output pulse of the SPAD array can easily be measured and, by means of a corresponding correction curve, the distance offset (range walk) can be related to the pulse width and the distance measurement can be correspondingly compensated for.

At the transmitter end, by way of example, a fiber amplifier "seeded" with laser diodes can be used, said fiber amplifier having a 1-to-N fiber coupler at the output. The latter can be used to generate in a simple manner a bundle of laser beams that irradiate the object to be measured.

The receiver can be constructed for example from a plurality of SPAD arrays 18A, 18B, which are arranged either one-dimensionally or two-dimensionally. Each SPAD array 18A, 18B has either separate drive and/or evaluation electronics. Owing to the compactness, by way of example, a set of TDC channels in an FPGA is preferable, if appropriate. Alternatively, the outputs of the SPAD arrays can, if appropriate, be addressed via a multiplexer and be fed to a common time measuring circuit. In order to reduce the number of output signals and thereby to save time measuring units, the microcells can for example also be combined to form a few domains, for example in individual quadrants each having a signal output. By way of example, a TDC time measuring unit arranged in the FPGA is then implemented at each signal output.

In the embodiment shown, the circuit comprises for example an oscillator 25 as a time base, e.g. with sub-ppm ("parts per million") precision, which oscillator drives a clock 26 implemented in the FPGA 24. The clock 26 is used firstly for the driving of a laser 16 and secondly as a basis for the TDC time measuring circuit 23 implemented in the FPGA 24. The laser 16 emits a laser measurement radiation 17 which is pulsed or modulated in a pulse-like manner and which, after reflection or backscattering at a target 5, impinges as reception radiation on a detector having one or more SPAD arrays 18A, 18B. The detector can be provided for example as a "single-pixel receiver" or as a "multi-pixel receiver". Furthermore, by way of example, a comparator 27 connected upstream of the TDC 23 is implemented in the FPGA 24.

The time-of-flight measurement based on the pulse width is carried out, on a computing unit 28, which is likewise implemented directly on the FPGA 24, wherein the range walk is compensated for example by means of a lookup table 29 implemented on the FPGA 24.

Figure 9:
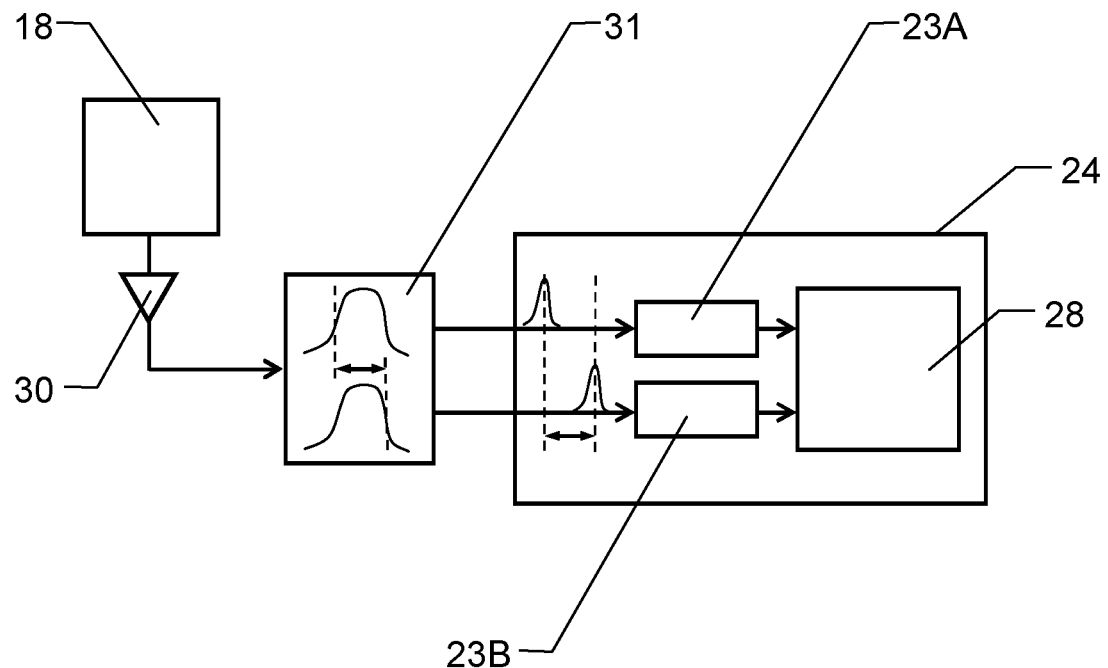
FIG. 9: shows an exemplary embodiment of a TDC circuit having two TDC channels implemented in an FPGA for a pulse width measurement.

FIG. 9 shows by way of example one embodiment of a TDC circuit comprising two TDC channels 23A, 23B implemented in an FPGA 24 for a pulse width measurement, e.g. for the purpose of a compensation according to the invention of a distance offset in the context of a signal time-of-flight measurement.

The detection signal of the SPAD array 18, said signal being converted for example by a current-to-voltage converter 30, e.g. a resistor or a transimpedance amplifier, is fed to a signal generating stage 31. Optionally, the signal fed to the signal generating stage 31 can be damped upstream, for example, by a VGA ("variable gain amplifier"), which is embodied in particular as a VGA having regulatable damping.

The signal generating stage 31 generates two analog, defined pulsed signals having a respectively defined temporal profile and defined amplitude, for example optimized for a signal range of a TDC connected downstream. The spacing of the two defined pulsed signals corresponds to the pulse width of the signal of the SPAD array. These synthetically generated signals are fed respectively to a TDC measuring unit with high time resolution. All these electronic modules can be implemented on an FPGA 24 for example as illustrated in FIG. 8.

The signal generating stage 31 has for example two comparator stages (not shown) and two pulse generator components (not shown). The two comparator stages of the signal generating stage 31 trigger in each case upon the rising and the falling edge, respectively, of the input signal.

For example, the comparator is triggered for the rising edge if the signal present at the comparator exceeds a predefined threshold value. The comparator thereupon generates a comparator output signal which is fed to the pulse generator component for example via two electronic flip-flop circuits (i.e. bistable multivibrators, high-speed logic gates, not illustrated), wherein a low-pass filter is possibly also connected downstream of the pulse generator component.

A shape signal triggered by the actually incoming signal (e.g. detected light pulse, and in this case as a result of passing a threshold) is thus present at the FPGA input. With these functionalities, together with the components connected upstream of the FPGA 24, a time measuring circuit is realized.

In an analogous manner, a time measuring circuit in the second channel can be formed by a comparator that triggers upon the falling edge of the input signal.

A computing unit 28 on the FPGA 24, together with the result from the first channel, determines the width of the input signal and carries out a time-of-flight measurement taking account of the pulse width, wherein the pulse width is used to eliminate a distance offset (range walk) caused by the unknown amplitude of the actually incoming signal.

Alternatively, the number of TDC channels can be increased, for example, without the complexity of the entire distance measuring circuit increasing significantly.

By way of example, the signal generating stage 31 can be configured in such a way that two measurement points are detected on the rising edge, from which the FPGA 24 connected downstream can determine the gradient of the edge. The gradient can be used as a signature for the reception signal strength in order to eliminate a generated distance offset (range walk). However, the gradient can also be used to eliminate further artefacts. If the gradient is not in the expected ratio to the pulse width, then there is at most a disturbance of the reception signal by a particular arrangement of the laser measurement beam with respect to the target object. If the laser beam, at an object edge, for example, strikes partly the first object and partly an object situated behind the latter, then a double reflection arises. If the two objects are closely spaced apart (<1 m), then the two assigned electronic reception pulses overlap and the relation between steepness of the rising edge and pulse width deviates from a previously determined reference value. As a result, double targets which lead to an overlap of reception pulses can be identified, corrected or at least partly eliminated.

In the case of a fourth channel according to the threshold value principle, the individual distances assigned to the double targets can even be accurately measured in any case and without a priori assumptions.

Optionally, a conventional WFD time measuring circuit (not shown) can also be furnished in a parallel arrangement with respect to the TDC time measuring circuit described above. This channel substantially consists of an amplifier stage, a low-pass or bandpass filter, and an ADC. The digital data generated by the ADC can be fed in particular to the same FPGA as the data of the TDC time measuring circuit.

Figure 10:
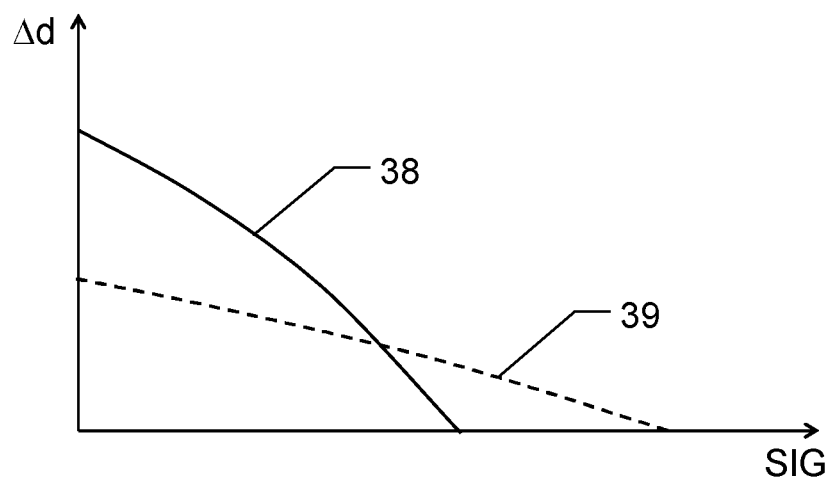
FIG. 10: shows exemplary range walk curves of SPAD arrays.

FIG. 10 shows by way of example two range walk curves, i.e. a variable distance offset Δd, of typical SPAD arrays as a function of a signature SIG of the signal profile of the SPAD output signal. As described with reference to FIGS. 4a and 4b, the signal response of SPAD arrays is dependent on the number of microcells. SPAD arrays having only a few microcells tend toward greater range walk 38 since the signal compression commences earlier, whereas in the case of SPAD arrays having, for example, more than 3000 microcells the range walk 39 is smaller since the output signal remains in a quasi-linear range over a larger signal range. By way of example, in the figure the reception signal strength is indicated as signature SIG, which, as already mentioned, serves as a measure of the signal strength.

Figure 11:
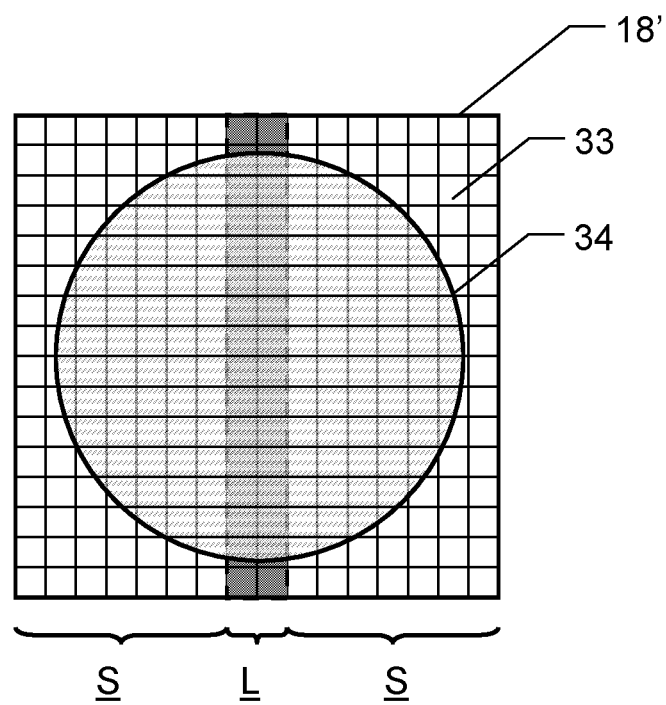
FIG. 11: shows an exemplary SPAD array with individually drivable subsets of microcells.

FIG. 11 shows by way of example a SPAD array 18''' configured in such a way that individual subsets of microcells 33 are separately drivable or readable.

Firstly, with a temporally different activation of individual microcells, for example alternately the even and the odd rows of a SPAD array, a shortening of the recovery time of the SPAD array, that is to say a faster pulse shot rate, can be made possible.

In the example shown, furthermore, the microcells 33 in a column L in the center of the SPAD array are driven in the linear mode (operation voltage<break voltage), whereas the microcells 33 in the regions S adjacent to the column L are driven in the SPL mode ("single photon mode", operation voltage>break voltage).

In the linear mode, the generated amplitude of the reception signal is detected with a high resolution even in the case of high overdriving. As a result, by way of example, a precise amplitude measurement is possible both in the lower and in the upper signal range, as a result of which an accurate compensation of the range walk error is also made possible.

In order that the reception radiation is distributed uniformly among the individual microcells 33, the incident light spot 34 can be provided for example by means of a diffuser, fiber-optic optical waveguide rod, square fiber, light funnel or by means of defocusing. In particular, as light mixers optical waveguides are particularly suitable because no light is lost through them.

Firstly, there is interest for example in a light distribution that is as uniform as possible, since then the SPAD array behaves similarly to an APE in the linear mode.

Secondly, SPAD arrays exhibit a so-called misaiming diagram, wherein the time of flight of the signal response is dependent on the position of the light spot 34. The microcells at the edge of the SPAD array are slower than those in the center. This time-of-flight effect can be averaged out by uniform illumination of all the microcells.

Figure 12:
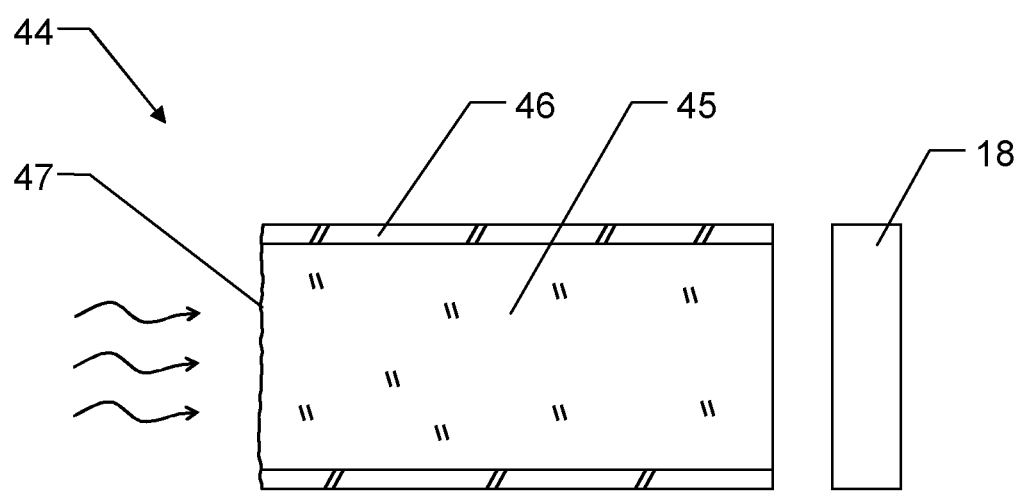
FIG. 12: shows a schematic illustration of a fiber-optic optical waveguide with light mixer.

FIG. 12 shows a variant of how the reception light can be distributed over the SPAD array 18 homogeneously in as defined a manner as possible. The aim is to illuminate as far as possible all the microcells of a SPAD array 18, moreover independently of the distance of the target object. Multimode optical waveguides composed of glass, quartz or plastic are particularly suitable and also known from previous APDs. By means of a mode scrambler, a particularly homogenous light distribution is achieved at the output of a multimode optical waveguide. The fiber end can be imaged by optical imaging onto the area of a SPAD array, hut the light can also be directly coupled at a short distance onto the sensitive area.

The figure shows one specific embodiment of an optical waveguide as a square fiber 44 having a matt-finished entrance surface 47. The matt finish generates a uniform illumination of the fiber cross section and the optical waveguide in the direction of the SPAD array 18 additionally mixes the optical signal by kaleidoscopic mirroring and simultaneously confines said signal by optical waveguiding in the region of the cross-sectional area. At the exit end of the square fiber 44, a homogenous light distribution over the SPAD array 18 is thus ensured. The square fiber 44 itself is constructed like a multimode optical waveguide, consisting of a core region 45 and an optical cladding 46. The optical cladding 46 has the effect that radiation having a direction of propagation within the numerical aperture cannot laterally leave the waveguide.

It goes without saying that said figures illustrated merely schematically illustrate possible exemplary embodiments.

What is claimed is:

1. A distance measuring device for determining a distance to a target, the device comprising:
   a radiation source for generating a transmission radiation;
   a transmission path for emitting at least one part of the transmission radiation to the target;
   a reception path comprising a receiver configured for detecting a reception signal based on at least one part of the transmission radiation returning from the target; and
   a computing unit configured for deriving the distance to the target on the basis of the reception signal,
   wherein:
      the receiver for detecting the reception signal comprises an optoelectronic sensor based on a SPAD array, wherein the SPAD array comprises a multiplicity of microcells each configured for an avalanche mechanism, and the microcells are connected in parallel to one or more output signals,
      the computing unit is configured to derive a signature parameter on the basis of the reception signal, wherein information regarding a signature of the signal profile of the reception signal is associated with the signature parameter,
      the reception path has a light mixer, configured to distribute returning parts of the transmission radiation uniformly to all microcells of the SPAD array,
      distance correction information is stored on the computing unit, the distance correction information corresponding to distance offsets which occur when deriving the distance and being dependent on the signal profile of the reception signal, and
      based on the derived signature parameter and the distance correction information, the computing unit takes account of a distance offset when deriving the distance.

2. The distance measuring device according to claim 1, wherein the signature parameter comprises at least one of the following:
   a signal amplitude of the reception signal,
   a curve maximum of the reception signal,
   a point of inflection of the reception signal,
   a maximum value of the gradient of the reception signal,
   a maximum value of the curvature of the reception signal,
   a pulse width of a pulse represented by the reception signal,
   a pulse shape of a pulse represented by the reception signal.

3. The distance measuring device according to claim 1, wherein the distance correction information provides shape information regarding a signal shape of the reception signal, said signal shape being dependent on the photocurrent density of the reception radiation.

4. The distance measuring device according to claim 1, wherein the computing unit is configured:
   to derive, on the basis of a threshold value being passed by the reception signal, a time value with respect to a point in time of reception of the reception signal, and
   to derive, on the basis of the distance correction information and the signature parameter of the reception signal, a time offset occurring when deriving the time value of the time value with respect to the actual point in time of reception of the reception signal detected by means of the time value,
   wherein the computing unit takes account of the time offset when deriving the time value.

5. The distance measuring device according to claim 1, wherein the distance correction information comprises at least one of the following:
   a lookup table which enables a correlation between values of a parameter used for deriving the distance and values of the signature parameter, and
   a function which outputs on the basis of values of the signature parameter of the reception signal as function parameter values of a parameter used for deriving the distance.

6. The distance measuring device according to claim 1, wherein the distance measuring device comprises a reception circuit having a differentiator.

7. The distance measuring device according to claim 1, wherein the distance measuring device comprises a reception circuit configured for processing the reception signal and for providing at least one of the following:
   waveform digitizing of the reception signal with time resolution having sub-picosecond accuracy,
   a time measuring circuit having a time-to-digital converter, and
   a phase measurement of the reception signal with respect to a transmission signal provided by the transmission radiation.

8. The distance measuring device according to claim 7, wherein the reception circuit and the computing unit are configured in such a way that an amplitude of the reception signal is derived on the basis of at least one of the following:
   a curve maximum of the reception signal,
   a point of inflection of the reception signal,
   a maximum value of the gradient of the reception signal,
   a maximum value of the curvature of the reception signal,
   a difference in curvature with respect to two positions in the rising and the falling edge of the reception signal,
   a pulse width of a pulse represented by the reception signal, or
   a pulse shape of a pulse represented by the reception signal.

9. The distance measuring device according to claim 1, wherein the SPAD array is configured in such a way that it has at least one of the following properties:
   a photosensitivity for wavelengths between 300 nm and 1100 nm,
   a photosensitivity for wavelengths between 700 nm and 2000 nm, and
   an overbreak operating mode.

10. The distance measuring device according to claim 1, wherein the radiation source is configured to provide the transmission radiation as pulsed laser measurement radiation.

11. The distance measuring device according to claim 1, wherein:
   the SPAD array comprises a multiplicity of microcells and is configured in such a way that the microcells are readable individually or in microcell groups and a first set of individually readable partial regions of the SPAD array is thereby definable,
   the computing unit is configured for controlling the receiver on the basis of a preprogrammed measurement sequence for detecting the reception signal,
   wherein the measurement sequence defines the detection of the reception signal by means of a defined temporal sequence of read-outs of individual partial regions of the first set of partial regions.

12. The distance measuring device according to claim 1, wherein the SPAD array is configured in such a way that the microcells are readable individually or in microcell groups, wherein the SPAD array is configured such that:
- a first set of individually readable partial regions (L) of the SPAD array is defined, wherein the partial regions of the first set of partial regions are configured in each case in such a way that they are operated in a linear detection mode below the breakdown voltage, and
- a second set of individually readable partial regions (S) of the SPAD array is defined, and the partial regions of the second set of partial regions are configured in each case in such a way that they are operated in an overbreak mode above the breakdown voltage.

13. The distance measuring device according to claim 1, wherein the receiver comprises a plurality of SPAD arrays, wherein the plurality of SPAD arrays are arranged one-dimensionally or two-dimensionally with respect to one another.

14. A distance measuring device for determining a distance to a target, the device comprising:
- a radiation source for generating a transmission radiation;
- a transmission path for emitting at least one part of the transmission radiation to the target;
- a reception path comprising a receiver configured for detecting a reception signal based on at least one part of the transmission radiation returning from the target; and
- a computing unit configured for deriving the distance to the target on the basis of the reception signal, wherein:
- the receiver for detecting the reception signal comprises an optoelectronic sensor based on a SPAD array, wherein the SPAD array comprises a multiplicity of microcells each configured for an avalanche mechanism, and the microcells are connected in parallel to one or more output signals,
- the SPAD array is configured in such a way that the microcells are readable individually or in microcell groups, wherein the SPAD array is configured such that:
  - a first set of individually readable partial regions (L) of the SPAD array is defined, wherein the partial regions of the first set of partial regions are configured in each case in such a way that they are operated in a linear detection mode below the breakdown voltage, and
  - a second set of individually readable partial regions (S) of the SPAD array is defined, and the partial regions of the second set of partial regions are configured in each case in such a way that they are operated in an overbreak mode above the breakdown voltage,
- the computing unit is configured to derive a signature parameter on the basis of the reception signal, wherein information regarding a signature of the signal profile of the reception signal is associated with the signature parameter,
- distance correction information is stored on the computing unit, the distance correction information corresponding to distance offsets which occur when deriving the distance and being dependent on the signal profile of the reception signal, and
- based on the derived signature parameter and the distance correction information, the computing unit takes account of a distance offset when deriving the distance.

15. The distance measuring device according to claim 14, wherein the signature parameter comprises at least one of the following:
- a signal amplitude of the reception signal,
- a curve maximum of the reception signal,
- a point of inflection of the reception signal,
- a maximum value of the gradient of the reception signal,
- a maximum value of the curvature of the reception signal,
- a pulse width of a pulse represented by the reception signal,
- a pulse shape of a pulse represented by the reception signal.

16. The distance measuring device according to claim 14, wherein the distance correction information provides shape information regarding a signal shape of the reception signal, said signal shape being dependent on the photocurrent density of the reception radiation.

17. The distance measuring device according to claim 14, wherein the computing unit is configured:
- to derive, on the basis of a threshold value being passed by the reception signal, a time value with respect to a point in time of reception of the reception signal, and
- to derive, on the basis of the distance correction information and the signature parameter of the reception signal, a time offset occurring when deriving the time value of the time value with respect to the actual point in time of reception of the reception signal detected by means of the time value, wherein the computing unit takes account of the time offset when deriving the time value.

18. The distance measuring device according to claim 14, wherein the distance correction information comprises at least one of the following:
- a lookup table which enables a correlation between values of a parameter used for deriving the distance and values of the signature parameter, and
- a function which outputs on the basis of values of the signature parameter of the reception signal as function parameter values of a parameter used for deriving the distance.

19. The distance measuring device according to claim 14, wherein the distance measuring device comprises a reception circuit having a differentiator.

20. The distance measuring device according to claim 14, wherein the distance measuring device comprises a reception circuit configured for processing the reception signal and for providing at least one of the following:
- waveform digitizing of the reception signal with time resolution having sub-picosecond accuracy,
- a time measuring circuit having a time-to-digital converter, and
- a phase measurement of the reception signal with respect to a transmission signal provided by the transmission radiation.

21. The distance measuring device according to claim 20, wherein the reception circuit and the computing unit are configured in such a way that the amplitude of the reception signal is derived on the basis of at least one of the following:
- a curve maximum of the reception signal,
- a point of inflection of the reception signal,
- a maximum value of the gradient of the reception signal,
- a maximum value of the curvature of the reception signal,
- a difference in curvature with respect to two positions in the rising and the falling edge of the reception signal,
- a pulse width of a pulse represented by the reception signal, or a pulse shape of a pulse represented by the reception signal.

22. The distance measuring device according to claim 14, wherein the SPAD array is configured in such a way that it has at least one of the following properties:
- a photosensitivity for wavelengths between 300 nm and 1100 nm,
- a photosensitivity for wavelengths between 700 nm and 2000 nm, and
- an overbreak operating mode.

23. The distance measuring device according to claim 14, wherein the radiation source is configured to provide the transmission radiation as pulsed laser measurement radiation.

24. The distance measuring device according to claim 14, wherein:
- a third set of individually readable partial regions of the SPAD array is definable,
- the computing unit is configured for controlling the receiver on the basis of a preprogrammed measurement sequence for detecting the reception signal,
- wherein the measurement sequence defines the detection of the reception signal by means of a defined temporal sequence of read-outs of individual partial regions of the third set of partial regions.

25. The distance measuring device according to claim 14, wherein the receiver comprises a plurality of SPAD arrays, wherein the plurality of SPAD arrays are arranged one-dimensionally or two-dimensionally with respect to one another.

* * * * *